United States Patent
Hiiro

(10) Patent No.: US 7,851,724 B2
(45) Date of Patent: Dec. 14, 2010

(54) LASER EXPOSURE APPARATUS AND LASER ANNEALING APPARATUS

(75) Inventor: Hiroyuki Hiiro, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 966 days.

(21) Appl. No.: 11/709,027

(22) Filed: Feb. 22, 2007

(65) Prior Publication Data

US 2007/0205185 A1 Sep. 6, 2007

(30) Foreign Application Priority Data

Feb. 23, 2006 (JP) .............................. 2006-046374

(51) Int. Cl.
*B23K 26/06* (2006.01)
*H01L 21/268* (2006.01)

(52) U.S. Cl. .......................... 219/121.66; 219/121.65; 219/121.73; 355/67; 438/795

(58) Field of Classification Search ............ 219/121.65, 219/121.66, 121.73, 121.77; 438/166, 487, 438/795; 355/67
See application file for complete search history.

(56) References Cited

U.S. PATENT DOCUMENTS 5,533,152 A * 7/1996 Kessler .................... 385/11
2006/0262408 A1 * 11/2006 Kato ....................... 359/618

FOREIGN PATENT DOCUMENTS

| JP | 10-62713 A | * | 3/1998 |
| JP | 2003-347236 A | | 12/2003 |
| JP | 2003-347236 A | * | 12/2003 |
| JP | 2006-5015 A | * | 1/2006 |
| JP | 2006-71855 A | * | 3/2006 |
| JP | 2007-27289 A | * | 2/2007 |

OTHER PUBLICATIONS

Machine translation of Japan Patent No. 2003-347,236, Jan. 2010.*

* cited by examiner

*Primary Examiner*—Geoffrey S Evans
(74) *Attorney, Agent, or Firm*—Sughrue Mion, PLLC

(57) ABSTRACT

A laser exposure which includes: a laser light source including a multi-transverse mode semiconductor laser; a far-field pattern forming optical system for forming a far-field pattern of multi-transverse mode laser light emitted from the laser light source; a condensing optical system for condensing the laser light emitted from the far-field pattern forming optical system and applying the condensed laser light to a substance to be exposed; and a coherency reducing element disposed in an optical path between the laser light source and the substance to be exposed, for reducing coherency of two wavefront components that are contained in high-order transverse mode light of each order emitted from the laser light source and propagate in substantially symmetrical directions with respect to the optical axis.

12 Claims, 3 Drawing Sheets

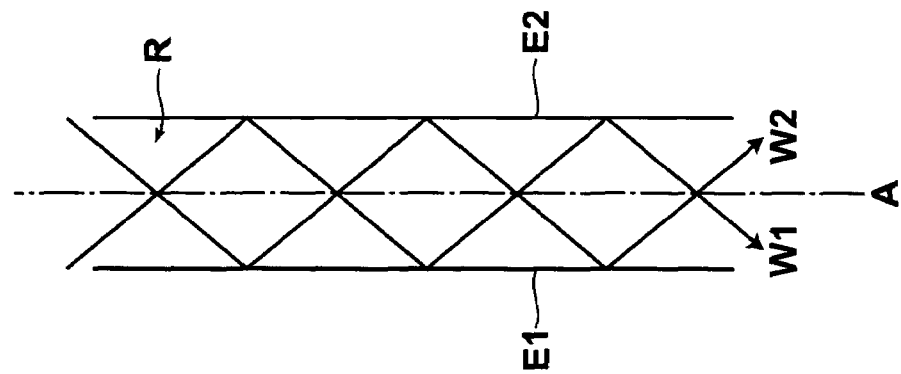
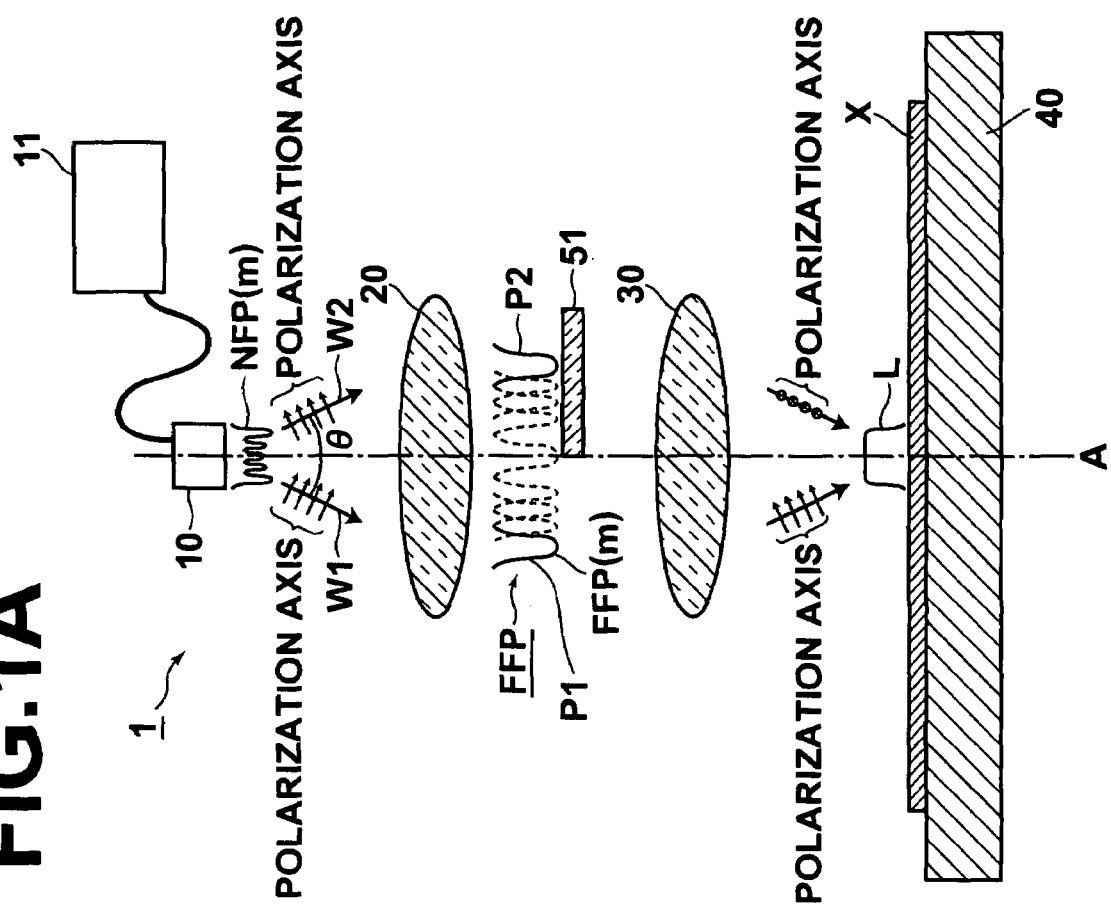

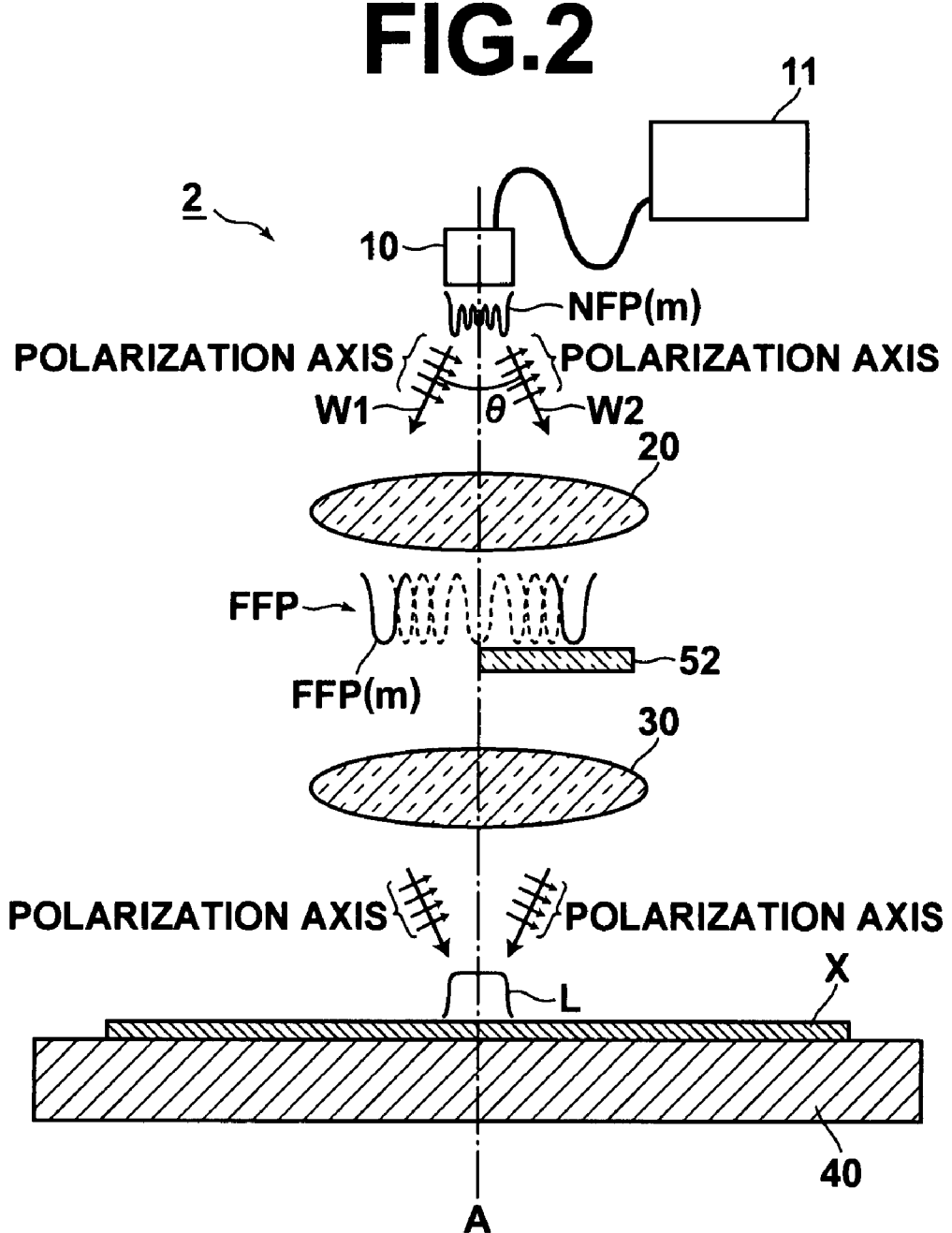

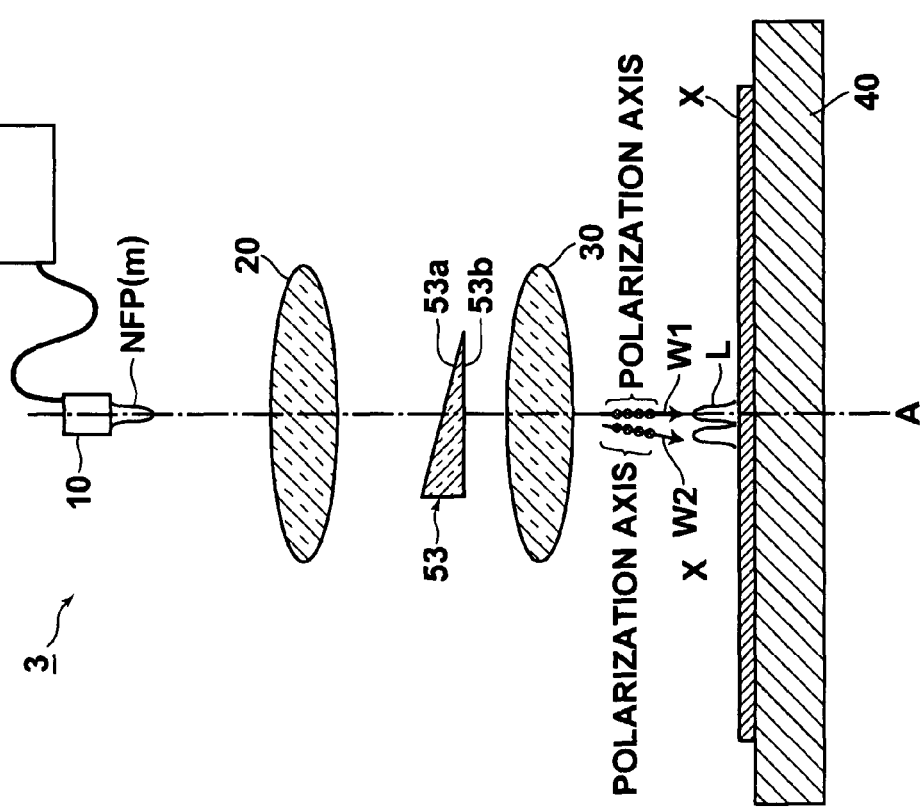
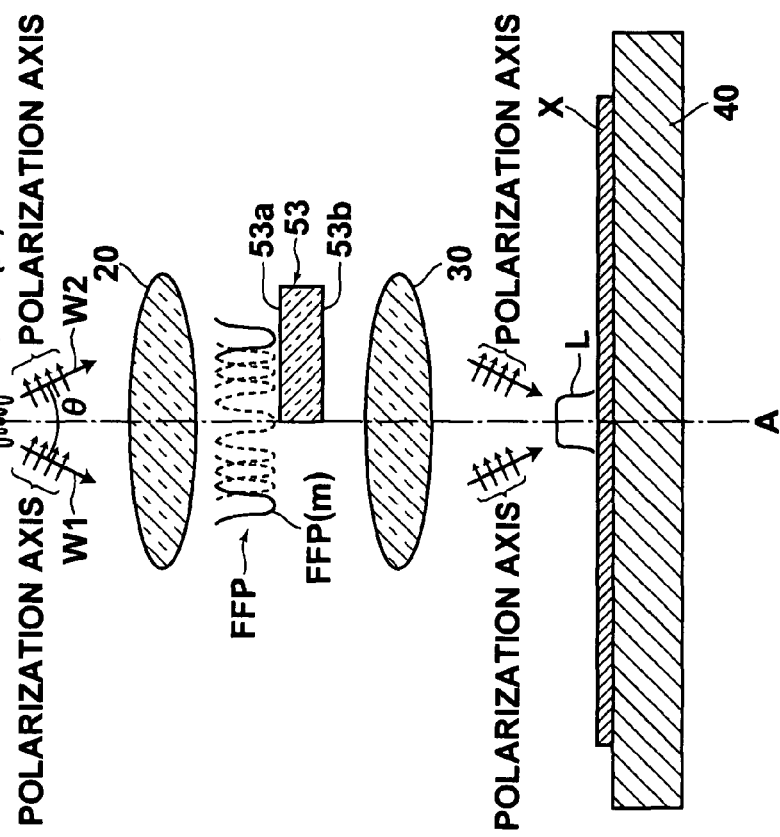

LASER EXPOSURE APPARATUS AND LASER ANNEALING APPARATUS

BACKGROUND OF THE INVENTION

1. Field of the Invention

The present invention relates to a laser exposure apparatus and a laser exposure method, which use a laser light source formed by a multi-transverse mode semiconductor laser. The present invention also relates to a laser annealing apparatus and a laser annealing method, which use a laser light source formed by a multi-transverse mode semiconductor laser.

2. Description of the Related Art

In the field of thin film transistors (TFT), or the like, laser annealing is conducted, in which an amorphous semiconductor film, such as an amorphous silicon film, is exposed to laser light to be annealed, thereby obtaining the polycrystalline semiconductor film.

As conventional laser light sources for use in laser annealing, excimer lasers have been widely used in view of high power and good light absorption by amorphous semiconductor films. In recent years, use of a solid-state laser or a semiconductor laser as the laser light source has been considered in view of easier maintenance and handling. Among solid-state lasers and semiconductor lasers, high power, multi-transverse mode semiconductor lasers are preferred.

In order to form a polycrystalline semiconductor film having a uniform and high mobility by the laser annealing, it is important to have a uniform intensity distribution of the laser light applied to the amorphous semiconductor film.

In conventional laser annealing apparatuses using excimer lasers, an optical homogenizing means such as a beam homogenizer is used to homogenize the intensity distribution of the laser light applied to the substance to be exposed. The excimer laser simultaneously emits multiple high-order transverse modes and has a relatively low spatial coherence. Therefore, the intensity distribution of the laser light applied to the substance to be exposed can be satisfactorily homogenized only by providing the optical homogenizing means in the optical path.

In contrast, the number of high-order transverse modes simultaneously emitted by a multi-transverse mode semiconductor laser is smaller than those emitted by the excimer laser, and the multi-transverse mode semiconductor laser has a higher spatial coherence than the excimer laser. Therefore, the intensity distribution of the laser light applied to the substance to be exposed cannot be homogenized simply by providing the optical homogenizing means in the optical path. This is because that high-order transverse mode light of a certain order emitted by the multi-transverse mode semiconductor laser has two wavefront components that propagate in substantially symmetrical directions with respect to the optical axis, and the two wavefront components interfere with each other.

Japanese Unexamined Patent Publication No. 2003-347236 discloses a laser exposure apparatus, wherein laser light emitted from a single laser light source is divided into multiple beams, and a difference in optical path length between the divided multiple beams is set to be not less than the coherence length of the laser light, so that the multiple beams do not interfere with each other. Then, the multiple beams are combined to be applied to the substance to be exposed. It should be noted that the invention of Japanese Unexamined Patent Publication No. 2003-347236 makes the divided multiple laser beams incoherent with each other, and it does not reduce coherency of the multi-transverse mode laser light.

SUMMARY OF THE INVENTION

In view of the above-described circumstances, the present invention is directed to provide a laser exposure apparatus and a laser exposure method, which allow, in a system using a multi-transverse mode semiconductor laser as a laser light source, reduction of coherency of the multi-transverse mode laser light and homogenization of intensity distribution of the laser light applied to a substance to be exposed.

The present invention is further directed to provide a laser annealing apparatus and a laser annealing method, which allow, in a system using a multi-transverse mode semiconductor laser as a laser light source, reduction of coherency of the multi-transverse mode laser light and homogenization of intensity distribution of the laser light applied to a substance to be exposed, thereby enabling uniform annealing of the substance to be exposed.

A laser exposure apparatus of the present invention includes: a laser light source including a multi-transverse mode semiconductor laser; a far-field pattern forming optical system for forming a far-field pattern of multi-transverse mode laser light emitted from the laser light source; a condensing optical system for condensing the laser light emitted from the far-field pattern forming optical system and applying the condensed laser light to a substance to be exposed; and a coherency reducing means disposed in an optical path between the laser light source and the substance to be exposed, for reducing coherency of two wavefront components that are contained in high-order transverse mode light of each order emitted from the laser light source and propagate in substantially symmetrical directions with respect to the optical axis.

In the laser exposure apparatus of the invention, the coherency reducing means may be disposed at a far field position or in the vicinity of the far field position.

The two wavefront components are completely separated at the far field position, and are also separated satisfactorily in the vicinity of the far field position. The term "the vicinity of the far field" used herein refers to an area that is substantially deemed as the far field area.

If a distance Z1 to a certain position from the end face of the multi-transverse mode semiconductor laser in the optical axis direction satisfies the condition below, the position is substantially deemed as being within the far field area. That is, positions in a range where formula (1) below is satisfied are the far field position and the vicinity of the far field position:

$$Z1 \gg \pi \times \lambda \times \frac{L^2}{\lambda} \sim \geq 10 \times \pi \times \lambda \times \frac{L^2}{\lambda} \qquad (1)$$

(wherein Z1 represents a distance from the end face of the multi-transverse mode semiconductor laser, L represents a width of the optical waveguide of the multi-transverse mode semiconductor laser, and λ represents a lasing wavelength.)

In the laser exposure apparatus of the invention, the far-field pattern forming optical system for forming the far-field pattern is disposed downstream from the multi-transverse mode semiconductor laser. An example of the far-field pattern forming optical system is a collimator lens that substantially collimates light emitted from the multi-transverse mode semiconductor laser.

If a collimator lens is provided as the far-field pattern forming optical system, a far-field pattern having a bimodal light intensity distribution is formed at the focal plane position or in the vicinity of the focal plane position downstream from the collimator lens. In this configuration, if a distance Z2 to a certain position from the focal plane position downstream from the collimator lens satisfies formula (2) below, the position is substantially deemed as being within the far field area:

$$Z2 \ll \frac{f^2}{\pi \times \lambda \times \frac{L^2}{\lambda}} \sim \leq \frac{f^2}{10 \times \pi \times \lambda \times \frac{L^2}{\lambda}} \quad (2)$$

(wherein Z2 represents a distance from the focal plane position downstream from the collimator lens, L represents a width of the optical waveguide of the multi-transverse mode semiconductor laser, λ represents a lasing wavelength, and f represents a focal length of the collimator lens.)

In the laser exposure apparatus of the present invention, the coherency reducing means may be a polarization controlling element which is disposed only in the optical path of one of the two wavefront components, and makes a polarization direction of the one wavefront component different from a polarization direction of the other wavefront component.

The coherency reducing means may be a translucent optical member which is disposed only in the optical path of one of the two wavefront components, and makes a difference in optical path length between the one wavefront component and the other wavefront component not less than a coherence length of the laser light emitted from the laser light source.

The coherency reducing means may be a translucent optical member which is disposed only in the optical path of one of the two wavefront components, and makes one of the two wavefront components be applied at a position on the substance to be exposed different from a position at which the other wavefront component is applied.

A laser annealing apparatus of the invention for annealing a substance to be exposed to improve crystal properties thereof includes: a laser light source including a multi-transverse mode semiconductor laser; a far-field pattern forming optical system for forming a far-field pattern of multi-transverse mode laser light emitted from the laser light source; a condensing optical system for condensing the laser light emitted from the far-field pattern forming optical system and applying the condensed laser light to an amorphous or polycrystalline substance to be exposed; and a coherency reducing means disposed in an optical path between the laser light source and the substance to be exposed, for reducing coherency of two wavefront components that are contained in high-order transverse mode light of each order emitted from the laser light source and propagate in substantially symmetrical directions with respect to the optical axis.

The "to improve crystal properties of the substance to be exposed" refers specifically to (1) to polycrystallize an amorphous substance to be exposed, (2) to increase an average crystal diameter of a polycrystalline substance to be exposed or (3) to single-crystallize a polycrystalline substance to be exposed.

A laser exposure method of the invention for applying laser light to a substance to be exposed using a laser light source including a multi-transverse mode semiconductor laser includes: reducing coherency of two wavefront components that are contained in high-order transverse mode light of each order emitted from the laser light source and propagate in substantially symmetrical directions with respect to the optical axis; and applying the laser light to the substance to be exposed.

In the laser exposure method of the invention, a far-field pattern of the multi-transverse mode laser light emitted from the laser light source may be formed in the optical path between the laser light source and the substance to be exposed, and coherency of the two wavefront components may be reduced at a far field position or in the vicinity of the far field position.

In the laser exposure method of the invention, the coherency of the two wavefront components may be reduced by making a polarization direction of one of the two wavefront components different from a polarization direction of the other wavefront component.

The coherency of the two wavefront components may be reduced by making a difference in optical path length between the two wavefront components not less than a coherence length of the laser light emitted from the laser light source.

The coherency of the two wavefront components may be reduced by making one of the two wavefront components be applied at a position on the substance to be exposed different from a position at which the other wavefront component is applied.

A laser annealing method of the invention for annealing an amorphous or polycrystalline substance to be exposed to improve crystal properties thereof by applying laser light to the substance to be exposed using a laser light source including a multi-transverse mode semiconductor laser includes: reducing coherency of two wavefront components that are contained in high-order transverse mode light of each order emitted from the laser light source and propagate in substantially symmetrical directions with respect to the optical axis; and applying the laser light to the substance to be exposed.

BRIEF DESCRIPTION OF THE DRAWINGS

FIG. 1A illustrates the configuration of a laser exposure apparatus (laser annealing apparatus) according to a first embodiment of the present invention;

FIG. 1B is a schematic diagram illustrating propagating directions of two wavefront components of high-order transverse mode light of a certain order in an optical waveguide of a semiconductor laser;

FIG. 2 illustrates the configuration of a laser exposure apparatus (laser annealing apparatus) according to a second embodiment of the invention; and FIGS. 3A and 3B illustrate the configuration of a laser exposure apparatus (laser annealing apparatus) according to a third embodiment of the invention.

DESCRIPTION OF THE PREFERRED EMBODIMENTS

First Embodiment

Now, referring to FIGS. 1A and 1B, the configuration of a laser exposure apparatus (laser annealing apparatus) according to a first embodiment of the present invention will be described.

The laser exposure apparatus 1 of this embodiment is an apparatus that applies laser light to a substance to be exposed X. The laser exposure apparatus 1 can be used, for example, as a laser annealing apparatus that anneals an amorphous or polycrystalline substance to be exposed X to improve crystal properties thereof. The laser exposure apparatus 1 can, for example, (1) polycrystallize an amorphous substance to be exposed X, (2) increase an average crystal diameter of a polycrystalline substance to be exposed X, or (3) single-crystallize a polycrystalline substance to be exposed X.

The substance to be exposed X is not particularly limited, and may be a film or a bulk body formed on a substrate. An example of the substance to be exposed X is an amorphous semiconductor film (having a film thickness of around 50 nm, for example) such as an amorphous silicon film formed on a glass substrate. Through laser annealing by the laser exposure apparatus 1, the amorphous semiconductor film can be changed into a melt polycrystalline semiconductor film. The polycrystallization of the amorphous semiconductor film is conducted, for example, during a process for producing a thin film transistor (TFT).

The laser exposure apparatus 1 of this embodiment includes a movable stage 40, on which the substance to be exposed X is placed. The movement and position of the movable stage 40 is controlled by a stage controlling means (not shown). In this embodiment, the substance to be exposed X is moved relative to the laser light as the movable stage 40 moves, so that the substance to be exposed X is scanned by the laser light.

In this embodiment, the position of the optical system for emitting the laser light is fixed and the substance to be exposed X is moved. However, the position of the substance to be exposed X may be fixed and the laser light may be moved for scanning.

The laser exposure apparatus 1 includes a laser light source 10 formed by a multi-transverse mode semiconductor laser driven by a driving power supply 11, a far-field pattern forming optical system 20 that forms a far-field pattern FFP of multi-transverse mode laser light emitted from the laser light source 10, and a condensing optical system 30 that condenses the laser light emitted from the far-field pattern forming optical system 20 and applies the condensed laser light to the substance to be exposed X.

As the far-field pattern forming optical system 20, a collimator lens maybe used, which collimates divergent light emitted from the laser light source 10, which is a point light source. The far-field pattern forming optical system 20 may be any optical system as long as it collimates at least horizontal directional (multi-transverse mode directional) components of the light emitted from the laser light source 10.

As the condensing optical system 30, a condenser lens may be used.

In the drawings, a near field pattern NFP, a far-field pattern FFP, and a laser light pattern L of the laser light applied to the substance to be exposed X are shown. These patterns represent patterns obtained by focusing the laser light at their respective positions using a focusing lens. In the drawings, the axis designated by "A" is the optical axis, and the transverse direction in the drawings is the direction of the multi-transverse mode.

If a collimator lens is used as the far-field pattern forming optical system 20, usually, a distance between the laser light source 10 and the far-field pattern forming optical system 20 is set to be equal to a focal length f of the collimator lens. In such a system, the far field position is at a distance from the far-field pattern forming optical system 20 corresponding to the focal length f of the collimator lens (i.e., Fourier plane). Positions of these members shown in the drawings are not their actual positions, for convenience.

The laser light source 10 formed by the multi-transverse mode semiconductor laser simultaneously emits multiple high-order transverse modes of different orders.

A near field pattern NFP(m) of high-order transverse mode light of a certain order m is a pattern having an intensity distribution with a plurality of peaks depending on the order and the phase being inverted alternately for each adjacent peaks.

As schematically shown in FIG. 1B, an optical waveguide R of the semiconductor laser has two end faces E1 and E2, which are parallel to the optical axis A. High-order transverse mode light of a certain order is emitted after repeatedly reflected between the two end faces E1 and E2, and therefore, the high-order transverse mode light of the certain order is a combination of pairs of two wavefront components W1 and W2 that propagate in substantially symmetrical directions with respect to the optical axis A.

It is known that an intrinsic mode that propagates through an optical waveguide of a semiconductor laser is approximated by a Hermite-Gaussian function (see, for example, "Semiconductor Lasers and Heterojunction Leds", H. Kressel and J. K. Butler, formula (5.7.20)). The Hermite-Gaussian function is a function with a plurality of peaks that are symmetrical with respect to the optical axis. Further, Fourier transformation of the Hermite-Gaussian function represents an angular spectrum component of the propagating light (see formula (6.6.13) of the same literature).

The fact that the intrinsic mode takes a form of a Hermite-Gaussian function indicates the presence of the two wavefront components that propagate in substantially symmetrical directions with respect to the optical axis, and indicates that the intrinsic mode is formed by a combination of pairs of wavefront components that propagate in substantially symmetrical directions with respect to the optical axis.

A relationship between the two wavefront components W1 and W2 is generally such that, when the wavefront component W1 is reflected at the end face E1, the wavefront component W2 is reflected at the end face E2, and when the wavefront component W1 is reflected at the end face E2, the wavefront component W2 is reflected at the end face E1.

It is believed that the interference between the two wavefront components W1 and W2 forms the near field pattern NFP(m) having the above-described intensity distribution and phase distribution.

Actually, multiple high-order transverse modes of different orders are simultaneously emitted, and therefore, the actual near field pattern NFP is a combination of the near field patterns NFP(m) of the high-order transverse modes of different orders.

A near field pattern NFP in a direction perpendicular to the active layer of the semiconductor laser is in a Gaussian distribution or in a single mode like Gaussian distribution (see FIG. 3B).

The two wavefront components W1 and W2 of high-order transverse mode light of a certain order m propagate in substantially symmetrical directions with respect to the optical axis A, and form a far-field pattern FFP(m) having a bimodal intensity distribution with peaks P1 and P2 that are substantially symmetrical with respect to the optical axis A.

Regardless of the order of the high-order transverse mode light, the high-order transverse mode light is formed by a combination of the pairs of the two wavefront components W1 and W2 that propagate in substantially symmetrical directions with respect to the optical axis A. However, a separation angle θ between the peaks P1 and P2 in the bimodal light intensity distribution is determined by factors such as a stripe width of the optical waveguide R of the semiconductor laser, a refractive index distribution, a lasing wavelength, and the order of the high-order transverse mode. The higher the order, the greater the peak separation angle θ.

In the drawings, the far-field pattern FFP(m) of the high-order transverse mode light having the greatest peak separation angle θ between the peaks P1 and P2 in the bimodal light intensity distribution is represented by the solid lines, and the far-field patterns FFP(m) of the high-order transverse mode light of the other orders are represented by the dashed lines.

Coherency between high-order transverse mode light of different orders is small, however, coherency is large between the two wavefront components W1 and W2 forming the high-order transverse mode light of each order.

If the high-order transverse mode light of the certain order m containing the two wavefront components W1 and W2 is simply focused on the substance to be exposed X, the near field pattern NFP(m) has an intensity distribution enlarged or reduced depending on a focusing magnification of the condensing optical system formed by the far-field pattern forming optical system 20 and the condensing optical system 30. This intensity distribution is nonuniform due to the interference between the two wavefront components W1 and W2.

In this embodiment, in order to homogenize the intensity distribution of the laser light applied to the substance to be exposed X, a coherency reducing means is provided in the optical path between the laser light source 10 and the substance to be exposed X, for reducing coherency of the two wavefront components W1 and W2 contained in the high-order transverse mode light of each order.

Specifically, as the coherency reducing means in this embodiment, a polarization controlling element 51 is provided in the optical path of the wavefront component W2, which is one of two wavefront components W1 and W2 contained in the high-order transverse mode light of each order. The polarization controlling element 51 makes the polarization direction of the wavefront component W2 different from the polarization direction of the other wavefront component W1.

An example of the polarization controlling element 51 is a retarder element, particularly, a half-wave retarder element that changes the polarization direction of one of the two wavefront components W1 and W2 from the polarization direction of the other wavefront component by 90° so that the wavefront components do not interfere with each other.

The polarization controlling element 51 can be provided at the far field position or in the vicinity of the far field position, for the two wavefront components W1 and W2 forming the high-order transverse mode light of each order are completely separated from each other at the far field position.

The laser exposure apparatus (laser annealing apparatus) 1 of this embodiment is configured as described above. In the laser exposure apparatus 1 of this embodiment, the polarization controlling element 51 is provided only in the optical path of the wavefront component W2, which is one of the two wavefront components W1 and W2 that are contained in the high-order transverse mode light of each order emitted from the laser light source 10 and propagate in substantially symmetrical directions with respect to the optical axis A, to make the polarization direction of one of the two wavefront components W1 and W2 different from the polarization direction of the other wavefront component. In this configuration, coherency between the two wavefront components W1 and W2 can be reduced, and further, the two wavefront components can be made not interfere with each other. It should be noted that the polarization controlling element 51 may be provided only in the optical path of the wavefront component W1.

In the laser exposure apparatus (laser annealing apparatus) 1 of this embodiment, coherency of the multi-transverse mode laser light emitted from the laser light source 10 can be reduced, and the intensity distribution of the laser light applied to the substance to be exposed X can be homogenized, as shown at "L" in FIG. 1A.

The laser exposure apparatus (laser annealing apparatus) 1 of this embodiment can anneal an amorphous or polycrystalline substance to be exposed X uniformly to uniformly improve the crystal properties thereof. Using the apparatus of this embodiment, a polycrystalline semiconductor film, or the like, which has high film uniformity and excellent mobility can be stably formed.

Second Embodiment

Next, referring to FIG. 2, a laser exposure apparatus (laser annealing apparatus) according to a second embodiment the invention will be described. Since the basic configuration of the apparatus of this embodiment is similar to that of the first embodiment, the same elements are designated by the same reference numerals and are not explained in detail.

The laser exposure apparatus (laser annealing apparatus) 2 of this embodiment includes, as the coherency reducing means for reducing coherency of the two wavefront components W1 and W2 contained in the high-order transverse mode light of each order, a translucent optical member 52 provided only in the optical path of the wavefront component W2, which is one of the two wavefront components W1 and W2. The translucent optical member 52 makes a difference in optical path length between the wavefront component W2 and the other wavefront component W1 not less than the coherence length of the laser light emitted from the laser light source 10.

A relationship between a coherence length $l_c$ and a light spectrum width $\Delta v$ (FWHM) of the laser light emitted from laser light source 10 satisfies formula (3) below, and the coherence length $l_c$ is represented by formula (4) below. From these relationships, an optical path length difference l to be set between the two wavefront components W1 and W2 satisfies formula (5) below.

An example of the translucent optical member 52 is a glass plate. For example, in order to make the optical path length difference l between the two wavefront components W1 and W2 not less than the coherence length $l_c$, a refractive index n and a thickness t of the translucent optical member 52 are set to satisfy formula (6) below.

$$\alpha \times l_c \times \Delta v = c \tag{3}$$

$$l_c = \frac{\lambda_c^2}{\alpha \times \Delta \lambda} \tag{4}$$

$$l \geq l_c = \frac{\lambda_c^2}{\alpha \times \Delta \lambda} \tag{5}$$

$$(n-1) \times t \geq l_c \tag{6}$$

(In formulae (3) to (6), $l_c$ represents a coherence length of the laser light; l represents a difference in optical path length to be set between the two wave front components W1 and W2; $\Delta v$ represents a width of light spectrum (FWHM); c represents a speed of light; $\alpha$ represents a constant that is determined depending on a light spectrum shape ($\alpha \approx 3.14$ in Lorenz shape and $\alpha \approx 1.51$ in Gaussian shape); $\lambda_c$ represents a central wavelength; n represents a refractive index of the translucent optical member 52; and t represents a thickness of the translucent optical member 52.)

The translucent optical member 52 is provided at the position similar to the position of the polarization controlling element 51 of the first embodiment. That is, the translucent optical member 52 is provided between the laser light source 10 and the substance to be exposed X, and in the optical path of the wavefront component W2, which is one of the two wavefront components W1 and W2. The translucent optical member 52 can be provided at the far field position or in the vicinity of the far field position, since the two wavefront components W1 and W2 forming the high-order transverse mode light of each order are completely separated from each other at the far field position.

The laser exposure apparatus (laser annealing apparatus) 2 of this embodiment is configured as described above. In the laser exposure apparatus 2 of this embodiment, the translucent optical member 52 is provided only in the optical path of the wavefront component W2, which is one of the two wavefront components W1 and W2 that are contained in the high-order transverse mode light of each order emitted from the laser light source 10 and propagate in substantially symmetrical directions with respect to the optical axis A, to make the difference in optical path length between the two wavefront components W1 and W2 not less than the coherence length of the laser light emitted from the laser light source 10. In this configuration, the two wavefront components can be made not interfere with each other. It should be noted that the translucent optical member 52 may be provided only in the optical path of the wavefront component W1.

The laser exposure apparatus (laser annealing apparatus) 2 of this embodiment provides the same effect as that of the first embodiment, in which coherency of the multi-transverse mode laser light emitted from the laser light source 10 is reduced, and intensity distribution of the laser light applied to the substance to be exposed X is homogenized.

The laser exposure apparatus (laser annealing apparatus) 2 of this embodiment can anneal an amorphous or polycrystalline substance to be exposed X uniformly to uniformly improve the crystal properties thereof. Using the apparatus of this embodiment, a polycrystalline semiconductor film, or the like, which has high film uniformity and excellent mobility can be stably formed.

Third Embodiment

Next, referring to FIG. 3, the configuration of a laser exposure apparatus (laser annealing apparatus) according to a third embodiment of the invention will be described. Since the basic configuration of the apparatus of this embodiment is similar to that of the first embodiment, the same elements are designated by the same reference numerals and are not explained in detail. FIG. 3A corresponds to FIG. 1A and FIG. 2, and FIG. 3B is a side view. In FIG. 3B, the transverse direction is a direction of the longitudinal mode of the laser light emitted from the laser light source 10.

In the laser exposure apparatus (laser annealing apparatus) 3 of this embodiment, as the coherency reducing means for reducing coherency of the two wavefront components W1 and W2 contained in the high-order transverse mode light of each order, a translucent optical member 53 is provided only in the optical path of the wavefront component W2, which is one of the two wavefront components W1 and W2. The translucent optical member 53 makes the wavefront component W2 be applied at a position on the substance to be exposed X different from a position at which the other wavefront component W1 is applied.

An example of the translucent optical member 53 is a prism. The shape of the prism is not particularly limited as long as it can make the wavefront components W1 and W2 be applied at different positions from each other on the substance to be exposed X. The translucent optical member 53 shown in FIG. 3 has a light receiving face 53a that is inclined along the longitudinal mode direction and a light emitting face 53b that is flat. In the example shown in the drawing, the wavefront component W2 is refracted by the prism, and therefore the wavefront components W1 and W2 are applied to the substance to be exposed X at different positions along the longitudinal mode direction.

The translucent optical member 53 is provided at the position similar to the position of the polarization controlling element 51 of the first embodiment. That is, the translucent optical member 53 is provided between the laser light source 10 and the substance to be exposed X, and in the optical path of the wavefront component W2, which is one of the two wavefront components W1 and W2. The translucent optical member 53 can be provided at the far field position or in the vicinity of the far field position, since the two wavefront components W1 and W2 forming the high-order transverse mode light of each order are completely separated from each other at the far field position.

The laser exposure apparatus (laser annealing apparatus) 3 of this embodiment is configured as described above. In the laser exposure apparatus 3 of this embodiment, the translucent optical member 53 is provided only in the optical path of the wavefront component W2, which is one of the two wavefront components W1 and W2 that are contained in the high-order transverse mode light of each order emitted from the laser light source 10 and propagate in substantially symmetrical directions with respect to the optical axis A, to make the wavefront components W1 and W2 be applied at different positions from each other on the substance to be exposed X. In this configuration, coherency of the two wavefront components W1 and W2 can be reduced, and further, the two wavefront components can be made not interfere with each other. It should be noted that the translucent optical member 53 may be provided only in the optical path of the wavefront component W1.

The laser exposure apparatus (laser annealing apparatus) 3 of this embodiment provides the same effect as that of the first embodiment, in which coherency of the multi-transverse mode laser light emitted from the laser light source 10 is reduced, and intensity distribution of the laser light applied to the substance to be exposed X is homogenized.

The laser exposure apparatus (laser annealing apparatus) 3 of this embodiment can anneal an amorphous or polycrystalline substance to be exposed X uniformly to uniformly improve the crystal properties thereof. Using the apparatus of this embodiment, a polycrystalline semiconductor film, or the like, which has high film uniformity and excellent mobility can be stably formed.

The laser exposure apparatus the present invention can be preferably used as a laser annealing apparatus, or the like, for annealing an amorphous or polycrystalline substance to be exposed to improve crystal properties thereof.

The laser exposure apparatus of the present invention includes the coherency reducing means disposed in the optical path between the laser light source formed by the multi-transverse mode semiconductor laser and the substance to be exposed. The coherency reducing means reduces coherency of the two wavefront components that are contained in the high-order transverse mode light of each order emitted from the laser light source and propagate in substantially symmetrical directions with respect to the optical axis. In the laser exposure apparatus of the present invention, coherency of the multi-transverse mode laser light can be reduced and intensity distribution of the laser light applied to the substance to be exposed can be homogenized.

The laser annealing apparatus of the present invention can uniformly anneal an amorphous or polycrystalline substance to be exposed to uniformly improve crystal properties thereof. Using the laser annealing apparatus of the present invention, a polycrystalline semiconductor film, or the like, which has high film uniformity and excellent mobility can be stably formed.

What is claimed is:

1. A laser exposure apparatus comprising:
   a laser light source including a multi-transverse mode semiconductor laser;
   a far-field pattern forming optical system for forming a far-field pattern of multi-transverse mode laser light emitted from the laser light source;
   a condensing optical system for condensing the laser light emitted from the far-field pattern forming optical system and applying the condensed laser light to a substance to be exposed; and
   a coherency reducing means disposed in an optical path between the laser light source and the substance to be exposed, for reducing coherency of two wavefront components that are contained in high-order transverse mode light of each order emitted from the laser light source and propagate in substantially symmetrical directions with respect to the optical axis.

2. The laser exposure apparatus as claimed in claim 1, wherein the coherency reducing means is disposed at a far field position or in the vicinity of the far field position.

3. The laser exposure apparatus as claimed in claim 1, wherein the coherency reducing means comprises a polarization controlling element being disposed only in the optical path of one of the two wavefront components, and the polarization controlling element makes a polarization direction of the one wavefront component different from a polarization direction of the other wavefront component.

4. The laser exposure apparatus as claimed in claim 1, wherein the coherency reducing means comprises a translucent optical member being disposed only in the optical path of one of the two wavefront components, and the translucent optical member makes a difference in optical path length between the one wavefront component and the other wavefront component not less than a coherence length of the laser light emitted from the laser light source.

5. The laser exposure apparatus as claimed in claim 1, wherein the coherency reducing means comprises a translucent optical member being disposed only in the optical path of one of the two wavefront components, and the translucent optical member makes one of the wavefront components be applied at a position on the substance to be exposed different from a position at which the other wavefront component is applied.

6. A laser annealing apparatus for annealing a substance to be exposed to improve crystal properties thereof, the apparatus comprising:
   a laser light source including a multi-transverse mode semiconductor laser;
   a far-field pattern forming optical system for forming a far-field pattern of multi-transverse mode laser light emitted from the laser light source;
   a condensing optical system for condensing the laser light emitted from the far-field pattern forming optical system and applying the condensed laser light to an amorphous or polycrystalline substance to be exposed; and
   a coherency reducing means disposed in an optical path between the laser light source and the substance to be exposed, for reducing coherency of two wavefront components that are contained in high-order transverse mode light of each order emitted from the laser light source and propagate in substantially symmetrical directions with respect to the optical axis.

7. A laser exposure method for applying laser light to a substance to be exposed using a laser light source including a multi-transverse mode semiconductor laser, the method comprising: reducing coherency of two wavefront components that are contained in high-order transverse mode light of each order emitted from the laser light source and propagate in substantially symmetrical directions with respect to the optical axis; and
   applying the laser light to the substance to be exposed.

8. The laser exposure method as claimed in claim 7, wherein a far-field pattern of the multi-transverse mode laser light emitted from the laser light source is formed in the optical path between the laser light source and the substance to be exposed, and coherency of the two wavefront components is reduced at a far field position or in the vicinity of the far field position.

9. The laser exposure method as claimed in claim 7, wherein the coherency of the two wavefront components is reduced by making a polarization direction of one of the two wavefront components different from a polarization direction of the other wavefront component.

10. The laser exposure method as claimed in claim 7, wherein the coherency of the two wavefront components is reduced by making a difference in optical path length between the two wavefront components not less than a coherence length of the laser light emitted from the laser light source.

11. The laser exposure method as claimed in claim 7, wherein the coherency of the two wavefront components is reduced by making one of the two wavefront components be applied at a position on the substance to be exposed different from a position at which the other wavefront component is applied.

12. A laser annealing method for annealing an amorphous or polycrystalline substance to be exposed to improve crystal properties thereof by applying laser light to the substance to be exposed using a laser light source including a multi-transverse mode semiconductor laser, the method comprising:
   reducing coherency of two wavefront components that are contained in high-order transverse mode light of each order emitted from the laser light source and propagate in substantially symmetrical directions with respect to the optical axis; and
   applying the laser light to the substance to be exposed.

* * * * *